Figure 1:
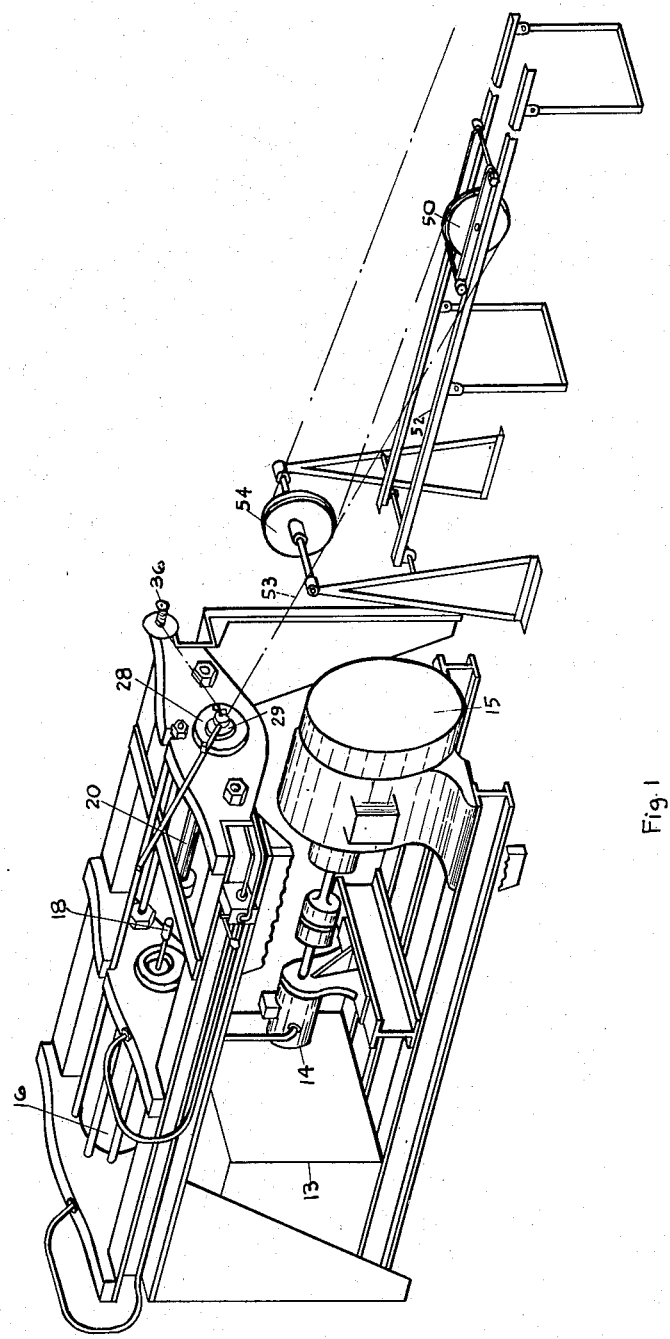

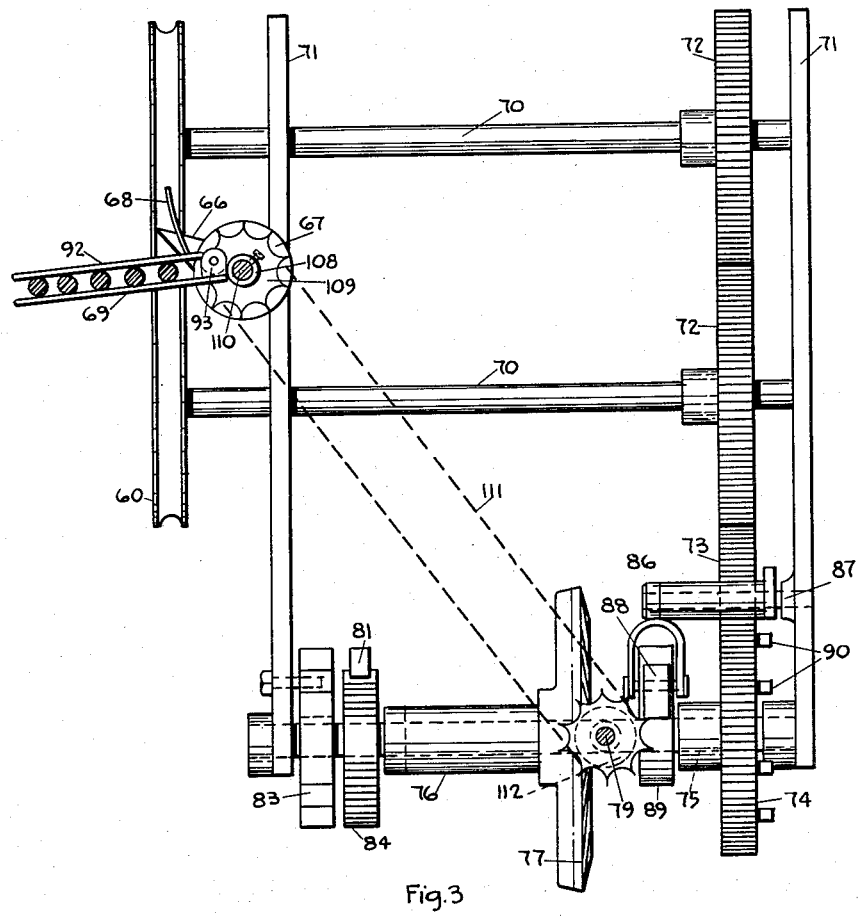

Patented Nov. 3, 1953

2,657,425

UNITED STATES PATENT OFFICE 2,657,425

APPARATUS FOR MAKING WAX CANDLES

Daniel James Keogh, Saltdean, England, assignor to Price's Patent Candle Company Limited, London, England, a British company Application May 12, 1951, Serial No. 226,010
Claims priority, application Great Britain
May 18, 1950

8 Claims. (Cl. 18—1)

The art of making wax candles has been practised for centuries and has not suffered any major change for very many years. The practice generally followed at the present time is to cast the wax in a mould along the axis of which a wick is stretched. The wick passes through a hole in a piston at the lower end of the mould, the piston being shaped to produce the conical or nearly conical tip of the candle. In order to remove the candle from the mould the piston is raised and the wick is cut so as to leave a short length projecting from the tip of the candle. This method requires the use of skilled labour and also suffers from the disadvantage that a considerable amount of time is required for sorting and preparing the candles for packing in addition to that required for making the candles themselves. Furthermore the method involves a substantial wastage of wick.

In my copending application Ser. No. 226,009, filed May 12, 1951, there is described and claimed a method of making a continuous rod of wax-covered wick by the cold extrusion of solid wax, and of converting this rod into candles by causing relative movements towards each other of the successive free ends of the rod and a rotating cutter adapted to uncover a short length of wick at the said ends of the rod, and then cutting off in succession the desired lengths of rod to form candles. The object of the present invention is to provide apparatus which is capable of operating at a high speed to convert a rod of wax-covered wick into candles, making a clean smooth cut at the tip of each candle.

The invention accordingly consists in apparatus for making candles from a continuous rod of wax-covered wick, which comprises feeding means for supporting the said rod and alternately advancing it through the length of a candle and holding it stationary, a rotating tipping cutter coaxial with the rod and mounted so as to be capable of axial movement towards and away from the free end of the rod, and having one or more blades which are so shaped and/or disposed that when the cutter is moved into contact with the rod the blades uncover a short length of wick and cut the tip of the wax to the desired shape, the blades being tangential to the tip of the wax cut thereby, reciprocating means for moving the tipping cutter axially towards and away from the rod, and a parting cutter synchronised with the said reciprocating means for cutting off the desired length of rod when the tipping cutter has completed its tipping operation and the rod is held stationary.

The apparatus according to the invention can readily be arranged to deliver the finished candles directly into packets for dispatch to the customer, or into a carton filling machine, thus effecting a considerable saving of labour as compared with the known method described above. Moreover the apparatus can be operated with unskilled labour, and is more economical of wick than the known method.

The apparatus according to the invention may advantageously be used in conjunction with apparatus for making a continuous rod of wax-covered wick by the method forming the subject of the aforesaid patent specification.

Figure 2:
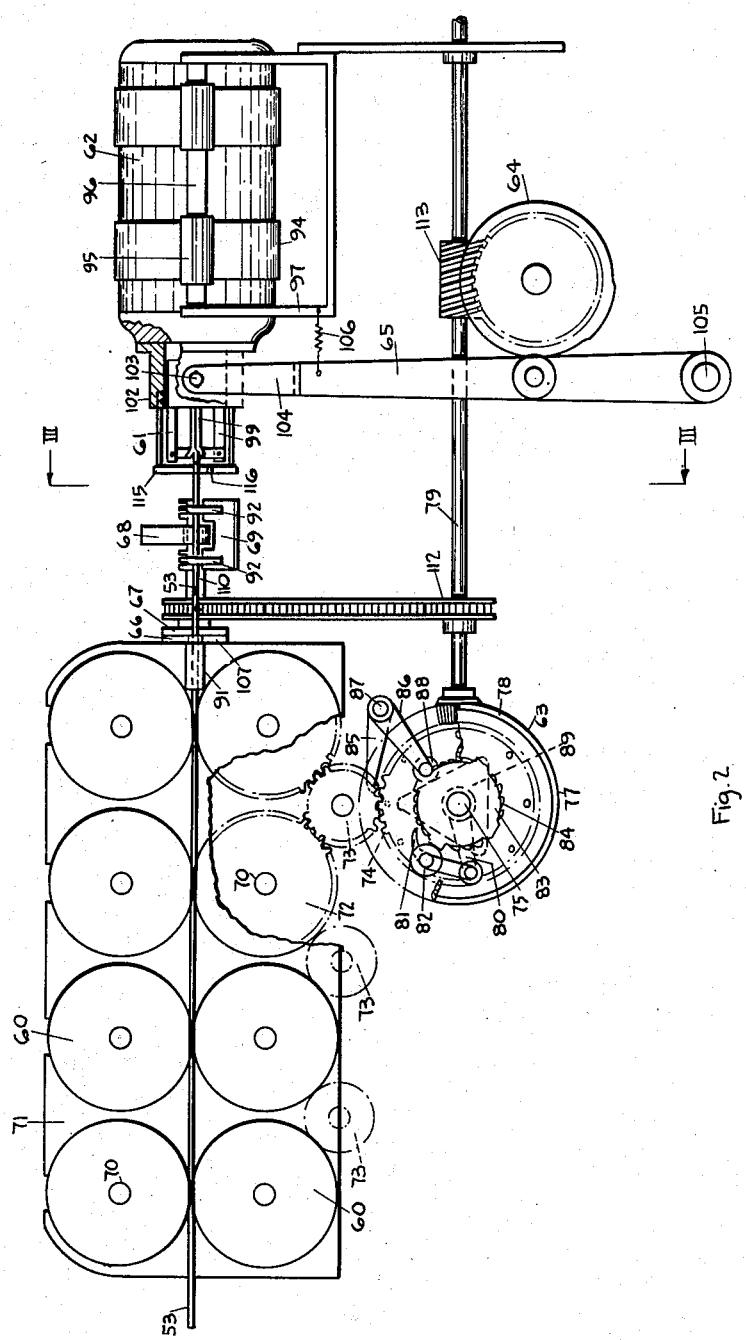

A preferred embodiment of the invention is illustrated by way of example by the accompanying drawings, in which Figure 1 is a perspective view of a machine for extruding a rod of wax-covered wick, Figure 2 is an elevational view of a machine for converting the rod of wax-covered wick into candles, Figure 3 is an end view of the machine shown in Figure 2, taken on the line III—III of that figure, and Figures 4A and 4B are end and perspective views respectively of the tipping cutter.

The machine shown in Figure 1 will be only briefly described herein, a full description being given in the aforesaid copending application. The wax is extruded from the extrusion cylinder 20 by means of a ram 18 through a die plate fixed to the nozzle plate 29. The nozzle plate assembly is hinged to the base plate 28 to enable the extrusion cylinder to be charged with a rod of wax for extrusion. The ram is operated by hydraulic oil derived from a tank 13 and pumped into the hydraulic cylinder 16 by a pump 14 actuated by the motor 15. The wick stored on the spool 36 is introduced into the centre of the die plate by a bent tube not visible in the drawing and is drawn forward by the wax as the latter is extruded. The resulting rod 53 of wax-covered wick is passed through a variable traverse device comprising a fixed pulley 54 and a pulley 50 running on inclined rails 52. This device enables the extrusion machine to be stopped for recharging with wax without stopping the tipping and cutting machine.

The tipping and cutting machine shown in Figures 2 and 3 comprises a set of four pairs of rollers 60 which grip and support the rod 53 and advance it to the tipping cutter head 61. The rollers 60 are fixed on shafts 70 which are rotatably mounted in a framework comprising plates 71 rigidly bolted together. Also fixed on shafts 70 are pairs of intermeshing gear wheels 72, the lower wheel of each pair also meshing with an idler pinion 73. One of the idler pinions 73 is engaged by a driving pinion 74 fixed on a shaft 75 which is rotatably mounted in the plates 71.

Mounted on the shaft 75 so as to be capable of independent rotation is a hollow shaft 76 to which is fixed a bevel gear 77. The latter meshes with a bevel gear 78 fixed on the shaft 79 of a motor not shown in the drawing. Fixed on one end of the shaft 76 is an arm 80 to which is pivoted a pawl 81 carrying a cam roller 82 which is urged by a spring (not shown) into contact with a fixed cam 83. The pawl 81 co-operates with a ratchet 84 fixed on the shaft 75. The driving shaft 79 is continuously rotated by the driving motor and continuously rotates the bevel gear 77, hollow shaft 76 and arm 80 in the clockwise direction (as seen in Figure 2). When the roller 82 is in contact with the depressions of the cam 83 the pawl 81 engages the ratchet 84 and turns the shaft 75, and hence the gear 74 and the rollers 60. When, however, the roller 82 rides on a projecting arc of the cam 83, the pawl 81 is disengaged from the ratchet 84 and the shaft 75 and rollers 60 are no longer driven. Thus the rollers 60 are given an intermittent motion. In order to prevent overrunning of the rollers and to hold them stationary during the periods when they are not driven, a locking arm 85 is provided having a hooked end which cooperates with studs 90 in the face of the gear wheel 74. The arm 85 constitutes one arm of a bell crank lever 85, 86 which is pivoted at 87 to the plate 71. The arm 86 carries a cam roller 88 which is held by a spring (not shown) in contact with a cam 89 fixed on the hollow shaft 76. The form of the cam 89 and the spacing of the studs 90 are such that when the rotational position of the shaft 76 is such that the pawl 81 is disengaged from the ratchet 84, the cam 89 causes the hook on the arm 85 to move downwards to engage one of the studs 90 and arrest the movement of the gear 74 and the rollers 60. On further rotation of the shaft 76 the cam 89 allows the roller 88 to move inwards and hence raises the hook on the arm 85 clear of the stud 90.

The wax rod 53 which is advanced intermittently by the rollers 60 passes through a guide tube 91 and then under rods 92 which are hinged to lugs 93 projecting upwards from a chute 69 fixed to the machine in a manner not shown in the drawings. A fractional horsepower motor 62 is provided with straps 94 having bearing bosses 95 on either side of the motor which are slidably mounted on guide rods 96 fixed in a frame 97. The shaft of the motor 62 is coaxial with the rod 53 and has fixed upon it a tipping cutter head indicated generally at 61. The head 61 comprises a collar 98 which is screwed to the motor shaft and has four projecting blade-carrying prongs 99. Each of the prongs is bent at its tip as shown (see Figures 4A and 4B) and a blade 100 is secured to each tip by a screw. Owing to the bending of the tips of the prongs 99, the blades 100 make a conical cut on the end of the rod 53 and the blades are held tangential to the resulting conical strip. As can be seen in Figure 4A, the blades do not meet at the centre, a small orifice 101 being left through which the uncovered wick protrudes when the conical cut is completed. Owing to the tangential arrangement of the blades a clean smooth cut is obtained even when working at the high rate of production of, say, 300 candles per minute.

The collar 98 is surrounded by a sleeve 102 which is bolted to the face of the motor 62. The sleeve 102 has bearing bolts 103 on which the forked ends 104 of an arm 65 are free to turn. The lower end of the arm 65 is mounted on a fixed pivot 105 and the arm is held in contact with a cam 64 by a tension spring 106. The cam is rotated by the driving shaft 79 through a skew gear 113. A guide plate 115 is bolted to the sleeve 102 and has a hole through which the rod 53 passes, to steady it during the tipping operation.

A parting knife 66 is secured by means of a ring 107 to a disc 67 which is fixed on the hub 108 of a chain wheel 109. The hub 108 is fixed by a set screw to a shaft 110 supported in bearings (not visible in the drawing) on the plate 71. The chain wheel 109 is driven by a chain 111 which meshes with a like wheel 112 fixed on the driving shaft 79.

The operation of the machine is as follows: The rod 53 is advanced intermittently, as described above, towards the tipping cutter head 61. When the length of rod which has been advanced is most equal to the length of the candle, the projection on the cam 64 comes in contact with the arm 65 and moves the tipping cutter head to meet the free end of the rod 53. This axial movement of the cutter head, which is kept in continuous rotation by the motor 62, is sufficient to bare a short length of wick and give the tip of the wax rod a conical shape, as described above. When the full length of rod has been advanced, the rollers 60 are arrested and, after the tipping operation is complete, the arm 65 moves off the projection on the cam 64 and allows the spring 106 to move the tipping cutter head 61 to the right, clear of the tip of the rod 53. The parting knife 66 now comes into contact with the rod 53 and severs the rod so as to form the finished candle. The latter is pushed down the chute 69 by a resilient arm 68 which is carried by the shaft 110 and works in a slot at the head of the chute 69. The candle leaves the central hole in the guide plate 115 through a slot 116 cut in the plate from the periphery to the central hole of the plate.

I claim:

1. Apparatus for making tipped candles from a continuous rod of wax-covered wick having a free end, which comprises: feed mechanism for supporting said rod with said free end forward and alternately advancing said rod axially forward through the length of a candle and holding it stationary; a tipping cutter mounted for rotation about the axis of the said rod in the feed mechanism and further mounted for axial movement towards and away from said free end of the rod, said cutter having one or more blades with cutting edges disposed substantially tangentially to said rod and spaced radially away from said axis to permit said wick to extend axially near said cutting edges, for cutting away wax at said free end of the rod and uncovering a short length of wick thereat; means for rotating said cutter; means for alternately moving said cutter toward and away from said rod; and a parting cutter for cutting off the desired length of rod when the tipping cutter has completed its tipping operation.

2. Apparatus according to claim 1 wherein said means for rotating the tipping cutter comprises an electric motor having an output shaft coaxial with said rod and the said tipping cutter is mounted on said shaft, said motor and cutter being slidably mounted as a unit on guide rods for axial movement towards and away from said free end of the rod.

3. Apparatus according to claim 1 wherein said means for alternately moving said cutter axially comprises mechanism synchronized with the operation of the feed mechanism for moving the cutter toward said free end of the rod after the feed mechanism has advanced the said rod.

4. In combination with the apparatus according to claim 3, means for actuating said parting mechanism in synchronism with said feed mechanism after the tipping cutter has completed its tipping operation and while said rod is held stationary.

5. Apparatus according to claim 1 wherein the said blades of the tipping cutter are fixed on the tips of prongs which are situated radially outwardly from and extend parallel to the said axis of the rod except at the tips of the prongs, said tips being bent so that the said cutting edges of the blades are substantially tangential to a cone, whereby the blades make a substantially conical cut on the said rod.

6. Apparatus according to claim 1 wherein the parting cutter comprises a rotatable support mounted for rotation about an axis offset from said axis of the rod and a knife blade secured to said rotatable support to cut said rod when the support is rotated.

7. In combination with the apparatus according to claim 1, extrusion apparatus for forming said continuous rod of wax-covered wick by extruding wax under pressure through an orifice about a continuous length of wick that is guided toward the center of said orifice; and a variable length take-up device for said rod situated between said extrusion apparatus and said feed mechanism, whereby said feed mechanism can be operated without interruption despite interruptions in the operation of the extrusion apparatus.

8. Apparatus for making tipped candles from a continuous rod of wax-covered wick having a free end, which comprises: feed mechanism having feed rolls for positioning said rod at a desired axis against rotation and advancing said rod axially; drive means for alternately turning said feed rolls to advance the rod through the length of a candle and holding the rolls stationary to maintain said rod in a stationary, advanced position; a tipping cutter mounted for rotation about said axis and for axial movement toward and away from said free end of the rod in the feed mechanism; said cutter having a plurality of blades with cutting edges disposed substantially tangentially to a cone on said axis, said edges being spaced apart radially to permit said wick to extend axially between said cutting edges, for cutting away wax at said free end of the rod and uncovering a short length of wick thereat; means for rotating said cutter; mechanism synchronized with the operation of the feed mechanism for moving the cutter toward said free end of the rod after the feed mechanism has advanced the rod, whereby said wax is cut from the free end thereof while the rod is held stationary; a parting cutter for cutting off the desired length of rod; and means for actuating said parting cutter in synchronism with said feed mechanism so as to cut the rod after the tipping cutter has completed its tipping operation and while said rod is held stationary.

DANIEL JAMES KEOGH.

References Cited in the file of this patent

UNITED STATES PATENTS

| Number | Name | Date |
|--------|------|------|
| 913,620 | Connor | Feb. 23, 1909 |
| 1,102,841 | Wolfl | July 7, 1914 |
| 2,510,383 | Dalgleish | June 6, 1950 |